US010826330B2

(12) United States Patent
Zargham et al.

(10) Patent No.: US 10,826,330 B2
(45) Date of Patent: *Nov. 3, 2020

(54) METHOD AND SYSTEM FOR A COMPLEMENTARY METAL OXIDE SEMICONDUCTOR WIRELESS POWER RECEIVER

(71) Applicants: Meysam Zargham, San Diego, CA (US); Glenn Gulak, Toronto (CA)

(72) Inventors: Meysam Zargham, San Diego, CA (US); Glenn Gulak, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/382,145

(22) Filed: Apr. 11, 2019

(65) Prior Publication Data

US 2019/0238004 A1 Aug. 1, 2019

Related U.S. Application Data

(63) Continuation of application No. 15/628,447, filed on Jun. 20, 2017, now Pat. No. 10,263,475, which is a (Continued)

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 50/70* (2016.02); *H04B 5/0037* (2013.01); *H04B 5/0075* (2013.01)

(58) Field of Classification Search
CPC ..................................................... H02J 50/12
(Continued)

(56) References Cited

U.S. PATENT DOCUMENTS 7,355,270 B2 4/2008 Hasebe et al.
8,552,597 B2 * 10/2013 Song ....................... H02J 50/27
307/149
2013/0260676 A1 10/2013 Singh

OTHER PUBLICATIONS

R.Wu,et.al,"Silicon-embedded receiving coil for high-efficiency wireless power transfer to implantable biomedical ics," IEEE Electron Device Lett.,vol. 34,no. 1,pp. 9-11,Jan. 2013.
(Continued)

*Primary Examiner* — Joseph Chang
(74) *Attorney, Agent, or Firm* — McAndrews, Held & Malloy, Ltd.

(57) ABSTRACT

Methods and systems for a complementary metal oxide semiconductor wireless power receiver may include a receiver chip with an inductor, a configurable capacitance, and a rectifier. The method may include receiving an RF signal utilizing the inductor, extracting a clock signal from the received RF signal, generating a DC voltage utilizing a rectifier circuit, sampling the DC voltage, and adjusting the configurable capacitance based on the sampled DC voltage. The rectifier circuit may include CMOS transistors and T-gate switches for coupling to the inductor. The T-gate switches may be controlled by the generated DC voltage. A signed based gradient-descent algorithm may be utilized to maximize the DC voltage. The DC voltage may be sampled utilizing a comparator powered by the DC voltage, which may adaptively configure the capacitance. The inductor may be shielded utilizing a floating shield. The DC voltage may be increased utilizing a voltage-boosting rectifier.

20 Claims, 21 Drawing Sheets

Related U.S. Application Data continuation of application No. 14/487,064, filed on Sep. 15, 2014, now Pat. No. 9,685,793.

(60) Provisional application No. 61/878,021, filed on Sep. 15, 2013.

(51) Int. Cl.
*H02J 50/70* (2016.01)
*H04B 5/00* (2006.01)

(58) Field of Classification Search
USPC .......................................................... 307/104
See application file for complete search history.

(56) References Cited

OTHER PUBLICATIONS

M.Zargham and P.G, Gulak,"Maximum achievable efficiency in nearfield coupled power-transfer systems,"IEEE Trans. Biomed. Circuits Syst.,vol. 6,No. 3,pp. 228-245,Jun. 2012.
A.Y.Poon,S.O'Driscoll,and T. H. Meng,"Optimal frequency for wireless power transmission into dispersive tissue,"IEEE Trans. Antennas Propag.,vol. 58,No. 5,pp. 1739-1749,May 2010.
S.Gabriel,etal,"The dielectric properties of biological tissues:II. measurements in the frequency range 10 Hz to 20 GHz," Phys. Med.Biol.,vol. 41,No. 11,pp. 2251-2269,Nov. 1996.
T.Cheunget.al.,"Shielded passive devices forsilicon-based monolithic microwave andmillimeter-wave integratedcircuits," IEEEJ. Solid-StateCircuits,vol. 41,No. 5,pp. 1183-1200,May 2006.
M.Mark,et al,"A 1mm3 2Mbps 330fJ/b transponder for implanted neural sensors," in Symp. on VLSI Circuits,,Jun. 2011, pp. 168-169.
S.O'Driscoll,et.al., "A mm-sized implantable powerreceiver with adaptative link compensation," in Proc.IEEE International Solid-State Circuits Conf.(ISSCC'09),Feb. 2009,pp. 294-295.

* cited by examiner

METHOD AND SYSTEM FOR A COMPLEMENTARY METAL OXIDE SEMICONDUCTOR WIRELESS POWER RECEIVER

CROSS-REFERENCE TO RELATED APPLICATIONS/INCORPORATION BY REFERENCE

This application is a continuation of U.S. application Ser. No. 15/628,447 filed on Jun. 20, 2017, which is a continuation of U.S. application Ser. No. 14/487,064 filed on Sep. 15, 2014, now U.S. Pat. No. 9,685,793, which claims priority to U.S. Provisional Application 61/878,021, filed on Sep. 15, 2013. This application also makes reference to U.S. application Ser. No. 14/148,590, filed on Jan. 6, 2014. Each of the above cited applications is hereby incorporated herein by reference in its entirety.

FIELD

Certain embodiments of the invention relate to wireless power transfer. More specifically, certain embodiments of the invention relate to a method and system for a complementary metal oxide semiconductor wireless power receiver.

BACKGROUND

Wireless power transfer (WPT) is important to many emerging applications and is commonly realized by means of near-field inductive coupling. This type of power delivery system is advantageously used for biomedical implants, neural activity monitoring/stimulation, emerging lab-on-chip (LoC) applications, RFID, and non-contact testing.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a complementary metal oxide semiconductor wireless power receiver, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE INVENTION

Certain aspects of the invention may be found in a method and system for a complementary metal oxide semiconductor wireless power receiver. The method and system may comprise in a receiver chip with an inductor, a configurable capacitance, and a rectifier: receiving an RF signal utilizing the inductor, extracting a clock signal from the received RF signal, generating a DC voltage utilizing a rectifier circuit, sampling the DC voltage; and adjusting the configurable capacitance based on the sampled DC voltage. The rectifier circuit may comprise complementary metal oxide semiconductor transistors and T-gate switches for coupling to the inductor. The T-gate switches may be controlled by the generated DC voltage. A signed based gradient-descent algorithm may be utilized to maximize the generated DC voltage. The DC voltage may be sampled utilizing a comparator powered by the generated DC voltage. The configurable capacitance may be adaptively configured based on the sampled DC voltage. The inductor may be shielded utilizing a floating shield and/or tapering. The generated DC voltage may be increased utilizing a voltage-boosting rectifier. The receiver chip may comprise a CMOS chip. The inductor may comprise a plurality of parallel conductive metal strips to meet density rules and reduce high-frequency eddy losses.

Figure 1A:
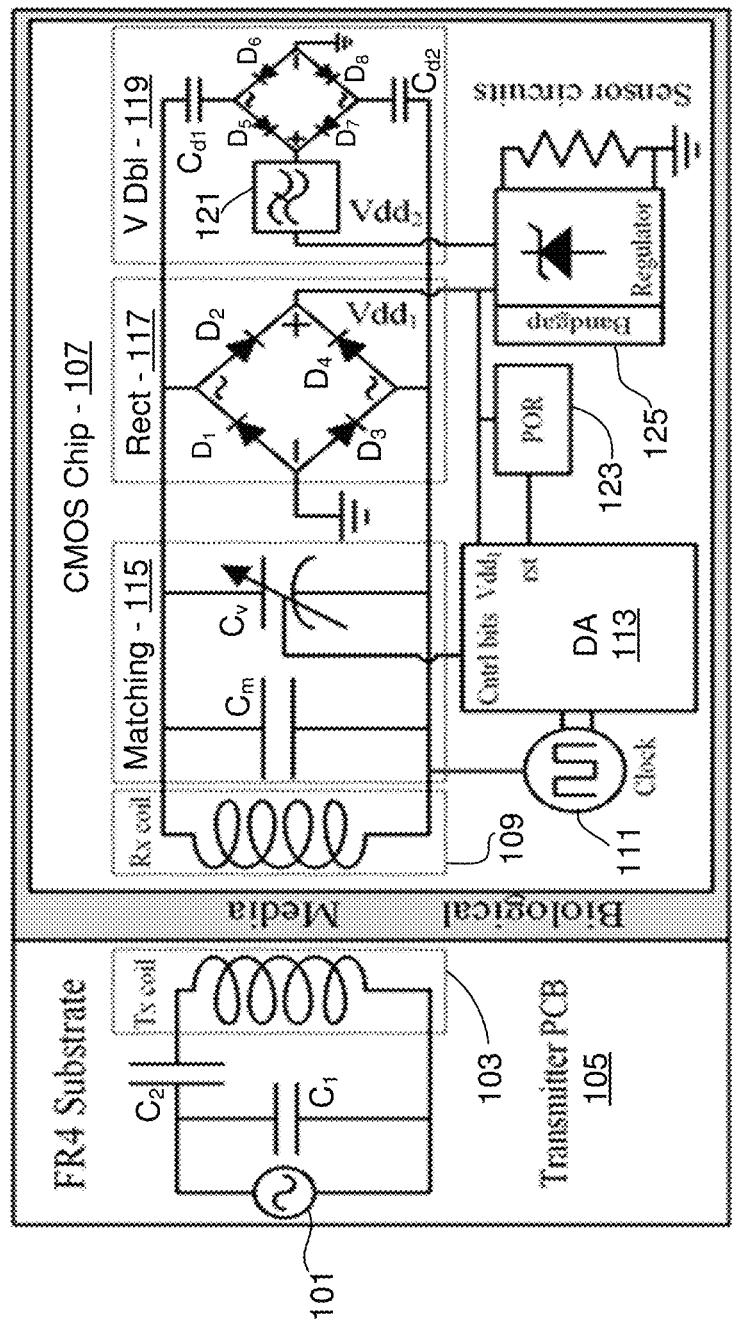
FIG. 1A is a system-level block diagram of a wireless power transfer receiver, in accordance with an example embodiment of the disclosure.

FIG. 1A is a system-level block diagram of a wireless power transfer receiver, in accordance with an example embodiment of the disclosure. FIG. 1 shows the block diagram of the proposed system where several innovations in each of the system components are presented.

In an example scenario, the wireless power transfer system may be configured for 10 mm of separation between coils. A gradient-descent optimization process using an electromagnetic (EM) simulator (Momentum) was performed to determine component values and coil structures. During the optimization, a detailed 12-layer CMOS substrate as well as frequency dependent properties of biological media were modeled based on four cole-cole parameters. Table I shows the final design geometry; note the coils only have a few turns.

TABLE I

FINAL COIL DESIGN VALUES.

|  | Transmitter | Receiver |
| --- | --- | --- |
| Substrate | FR4 | 0.13 µm CMOS |
| Number of Turns | 2 | 4 (M7, M8 in series) |
| Size (mm) | 14.5 × 14.5 | 2 × 2.18 |
| Trace Width (µm) | Tapered: (2000 to 1500) | 140 |
| Trace Spacing (µm) | 1200 | 40 |

The present disclosure is related to methods and circuits for wireless power transfer to a complementary metal oxide semiconductor (CMOS) chip. The disclosure relates to an on-chip coil used in conjunction with a transmitter board with the link operating in an inductively coupled capacity. Methods present a complete system for wireless power harvesting including: tuned inductor and capacitor tank, rectifier, regulator, bandgap, power-on-reset, and adaptive matching algorithm.

Implanted Medical Devices (IMD) are frequently powered using an inductively coupled link. However, traditional wireless power links, often utilizing an external receiver (Rx) coil, are bulky and suffer from reliability issues. A solution is to integrate the receiver coil with the rest of the circuitry on a single die in standard CMOS. The resulting single-chip prototype would be low-cost, mass producible, compact, and reliable and can potentially be used in a bare die form with minimal encapsulation. This level of integration also enables new possibilities for disposable lab-on-chip solutions. This disclosure demonstrates that with proper coil design and circuit techniques at the appropriate operating frequency, it is possible to achieve comparable or better wireless power transfer (WPT) efficiencies in standard CMOS than competing approaches. FIG. 1 shows the block diagram of the WPT system 100 where several innovations in each of the system components are presented. In this example, the Rx coil is realized with a 2×2.18 mm² on-chip coil, although other coil dimensions may be utilized.

Figure 3:
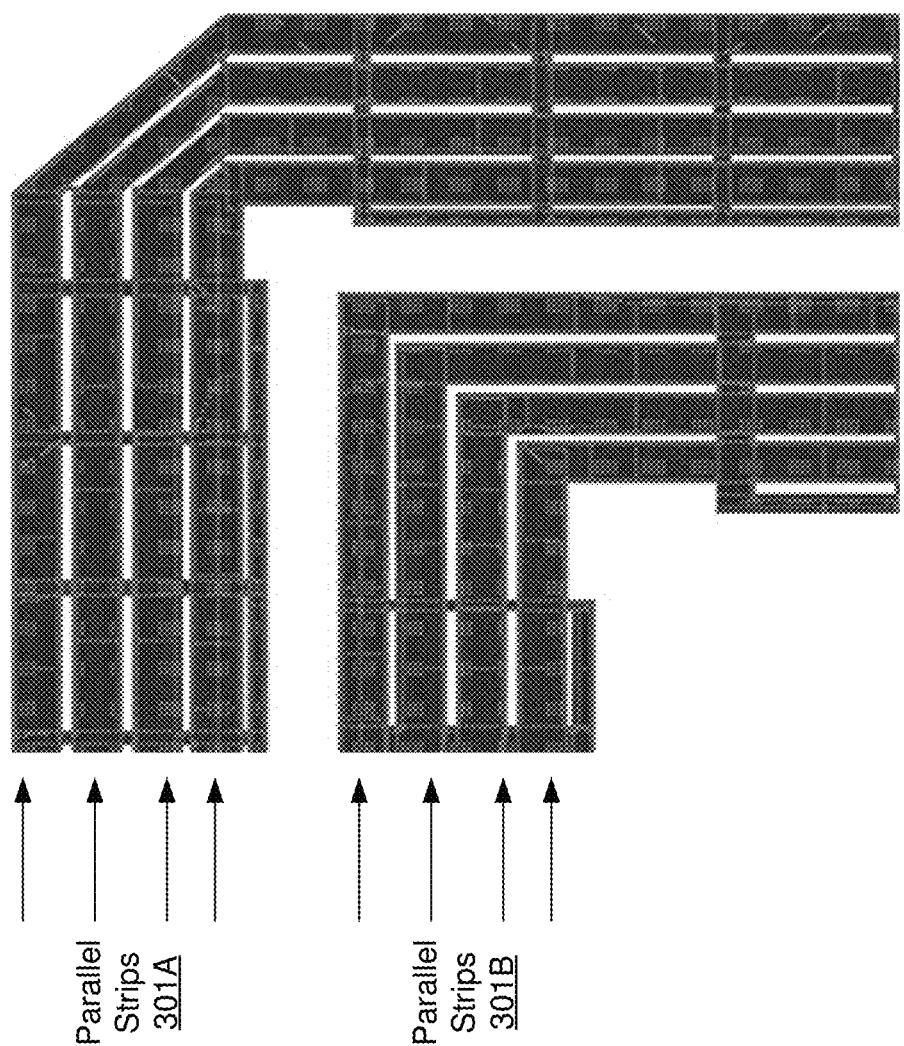
FIG. 3 illustrates a wide metal implementation for a receiver coil, in accordance with an example embodiment of the disclosure.

The Rx coil 109 may be integrated on a CMOS chip using metal layers. The Rx coil 109 wide metal layer may be broken down into parallel strips to comply with fabrication design rules, as illustrated in FIG. 3. As the coil is miniaturized, the frequency of the electromagnetic waves may be increased to compensate for the smaller coil area. On the other hand, the loss of energy through media and the silicon substrate increase with frequency. The consequence of these two competing effects leads to an optimum frequency that maximizes the wireless power efficiency.

A capacitor $C_m$ may be integrated near terminals of the receiver coil 109 in order to provide maximum achievable efficiency. The coil may then be coupled to circuits 117, 119, 121, and 123, which rectify and regulate the incoming power in order to power the WPT system and any auxiliary systems. An adaptive matching circuit 115 may be utilized to match the susceptance to better than 2% of the optimum value. The adaptive matching circuit 115 may comprise a fixed capacitor $C_m$, and a variable, or configurable, capacitor $C_v$. It is possible to find global optimum load susceptance by maximizing the receiver power with respect to the load capacitance under a fixed load resistance.

Figure 12:
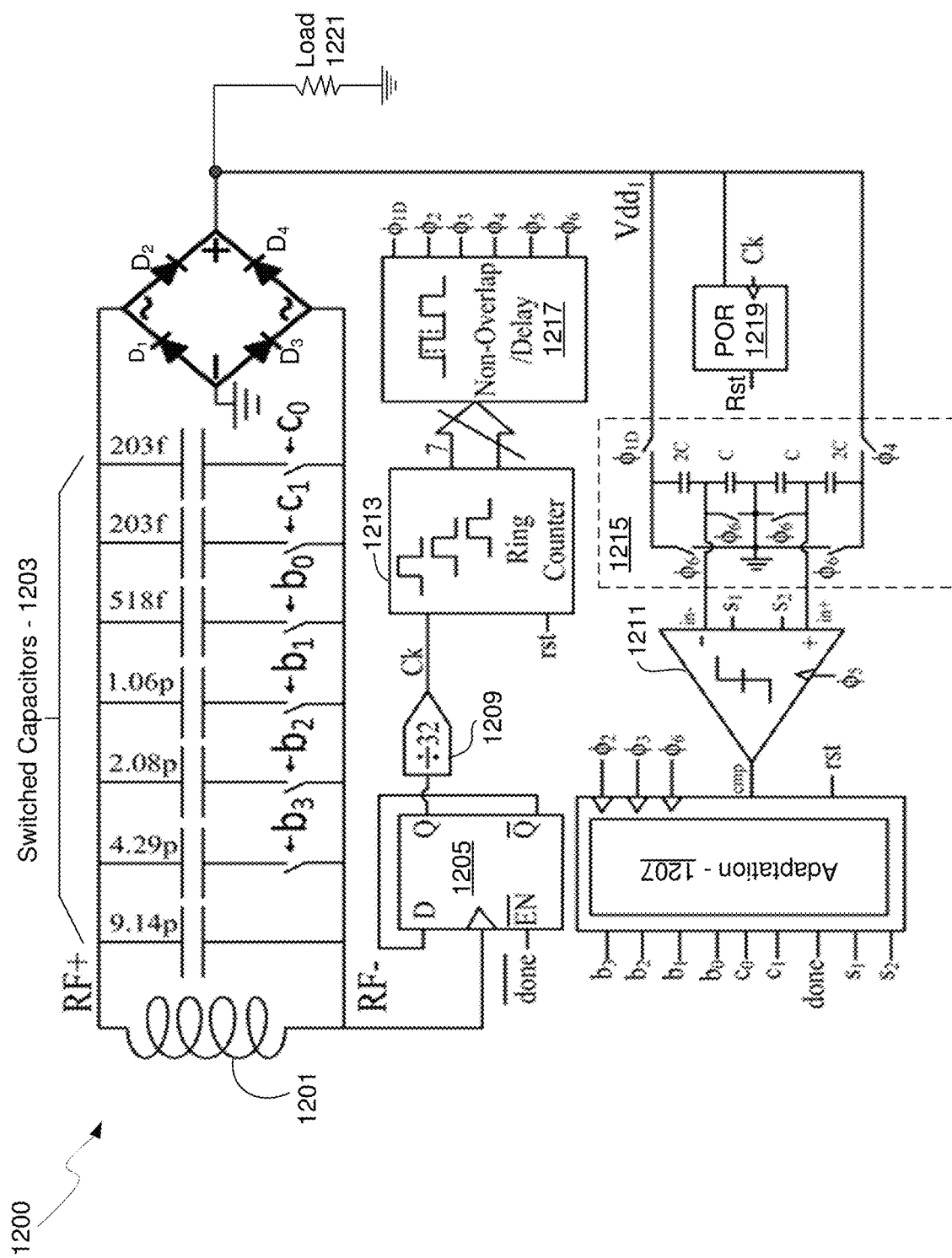
FIG. 12 is a block diagram of an adaptation circuit, in accordance with an example embodiment of the disclosure.

The optimization may be realized using a gradient descent algorithm by varying the capacitance under a fixed resistive load and monitoring the gradient of the power delivered to the load at the output of the rectifier. The algorithm may be executed by processing circuitry in the digital adaptation circuit 113, with an output signal configuring the variable capacitor $C_v$, such as via CMOS-switched capacitances, as illustrated in FIG. 12. The algorithm may then be initialized during the reset state using the power-on-reset (POR) circuit, and then maximize the power efficiency by adjusting the load susceptance.

Once the algorithm converges to an optimum susceptance, it may disable the clock 111 and start the application circuits. In the rectifier 117, the gates of NMOS transistors may be connected to the Rx coil using a T-gate switch, as illustrated in FIG. 12. The T-gate may be controlled by a positive feedback signal from the rectifier output. Initially, the T-gate switches may be off and the rectifier behaves similar to a two-diode rectifier.

As the output voltage increases, the T-gates may become more effective in passing the charge. Hence, further improving the output voltage through the positive feedback. Once the output surpasses the threshold voltage of the T-gate transistors, the rectifier 117 may transform into a full-wave bridge rectifier and effectively rectify the harvested voltage. A regulator with large power supply rejection ratio (PSRR) may be an important part of a wireless power transfer system. The regulator and bandgap circuit 125 may comprise a linear series regulator, and may exhibit a high PSRR by effectively lowering the impedance at the output of the regulator. The regulator may comprise NMOS pass transistors to achieve a better power supply rejection for a given power budget. A second voltage boosting rectifier 119 may be used as part of the regulator to provide the higher voltages needed by NMOS transistors.

Figure 1B:
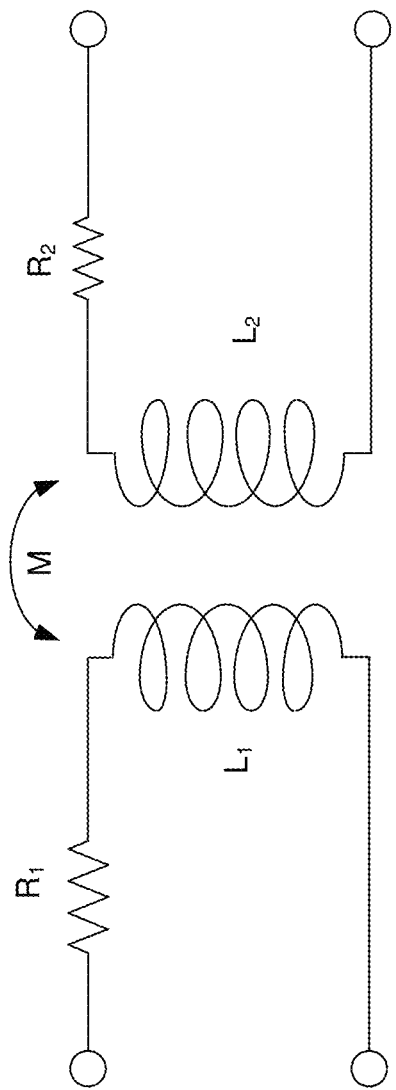
FIG. 1B is a diagram illustrating inductive wireless transfer, in accordance with an example embodiment of the disclosure.

FIG. 1B is a diagram illustrating inductive wireless transfer, in accordance with an example embodiment of the disclosure. Referring to FIG. 1B, there is shown a coil L1 adjacent to coil L2, where both coils have a non-zero resistance indicated by resistors R1 and R2. The mutual inductance due to the proximity of the coils is indicated by "M" and may be a measure of the amount of current induced in one coil due to a changing current in the other coil.

The arrangement shown in FIG. 1B represents a simple form of inductive wireless power transfer through air. The maximum achievable power efficiency, $\eta_{mnax}$, from the input to the output may be given by $$\eta_{max} = \frac{k^2 Q_1 Q_2}{\left(1 + \sqrt{1 + k^2 Q_1 Q_2}\right)^2}. \quad (1)$$

where $Q_1$ and $Q_2$ are the quality factor for each of the inductors and k is the coupling factor between the two coils.

The power efficiency of a near-field link is a measure of: (i) the power loss in circuits both at the transmitter and receiver, (ii) the absorbed electromagnetic energy in media in between the coils that causes the local temperature to increase (possibly harming biological tissue, or biological agents in a LoC application), and (iii) how often the battery has to be recharged when used in the context of portable medical devices. Therefore, in the case of biomedical implant applications, low-efficiency wireless power transmission implementations may cause discomfort and possible complications for the patients using an implant. Similar issues occur in the case of laboratory-on-chip applications where the local temperature of a small 10 to 100 μL biological sample being measured needs to be held within strict tolerances (often within one Centigrade degree). Therefore, it is not possible to arbitrarily increase the strength of the electromagnetic fields to realize greater power transfer to the embedded system. In most applications, achieving high power-efficiency is extremely challenging due to the restriction on the geometry of the inductive media.

The term "media" in this disclosure may comprise any liquid, gas, solid, or combination thereof and may include organic or inorganic substances, biological material, biological agents, biological tissue, chemical compositions, buffer solutions, and solutes in a solvent, for example. Accordingly, the coils may be configured based on what type of material, or media, is to be measured or assessed.

Figure 2:
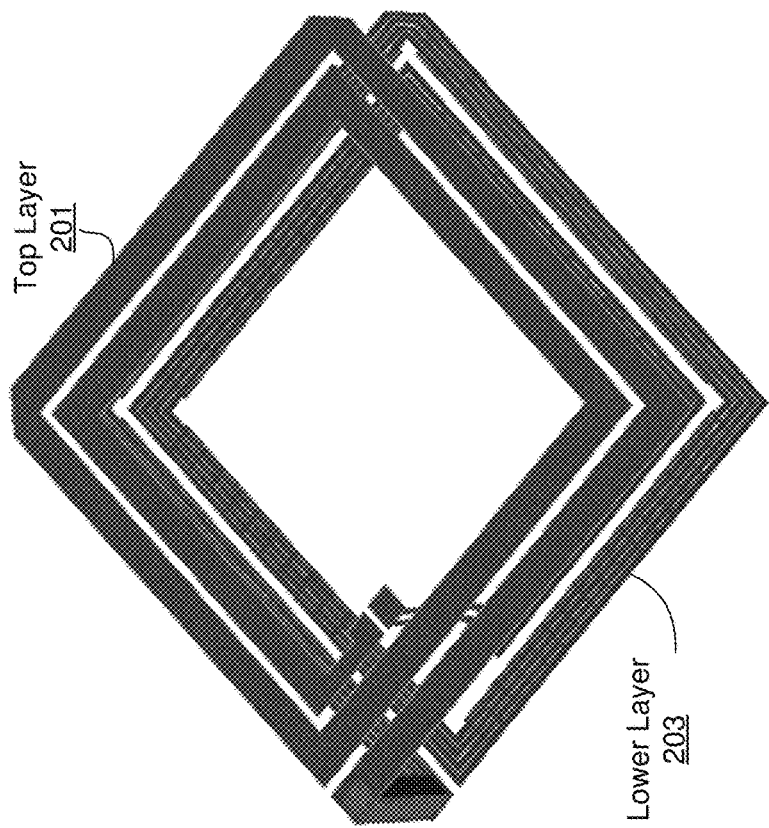
FIG. 2 illustrates a 3D model for a receiver coil configuration, in accordance with an example embodiment of the disclosure.
Figure 2:
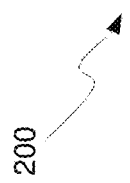

FIG. 2 illustrates a 3D model for a receiver coil configuration, in accordance with an example embodiment of the disclosure. The coil 200 may be implemented using the two top metal layers 201 and 203 of a CMOS process in series. The receiver coil 200 may employ any combination of metal layers and series/parallel loops to realize the coil. Integrating the coil 200 on the CMOS chip comprising the receiver electronics greatly reduces device size and cost as compared to off-chip coils. In an alternative scenario, an off-chip coil may be utilized if certain parameters are required, such as quality factor. The coil 200 may be implemented in a differential form to provide better symmetry resulting in improved quality factor and self-resonance frequency for the coil.

FIG. 3 illustrates a wide metal implementation for a receiver coil, in accordance with an example embodiment of the disclosure. FIG. 3 shows one possible method of implementing the wide metal layers in a standard CMOS process without violating any DRC rules. The section of the coil shown illustrates a Rx coil wide metal layer broken down into parallel strips 301A and 301B to comply with fabrication design rules.

Figure 4:
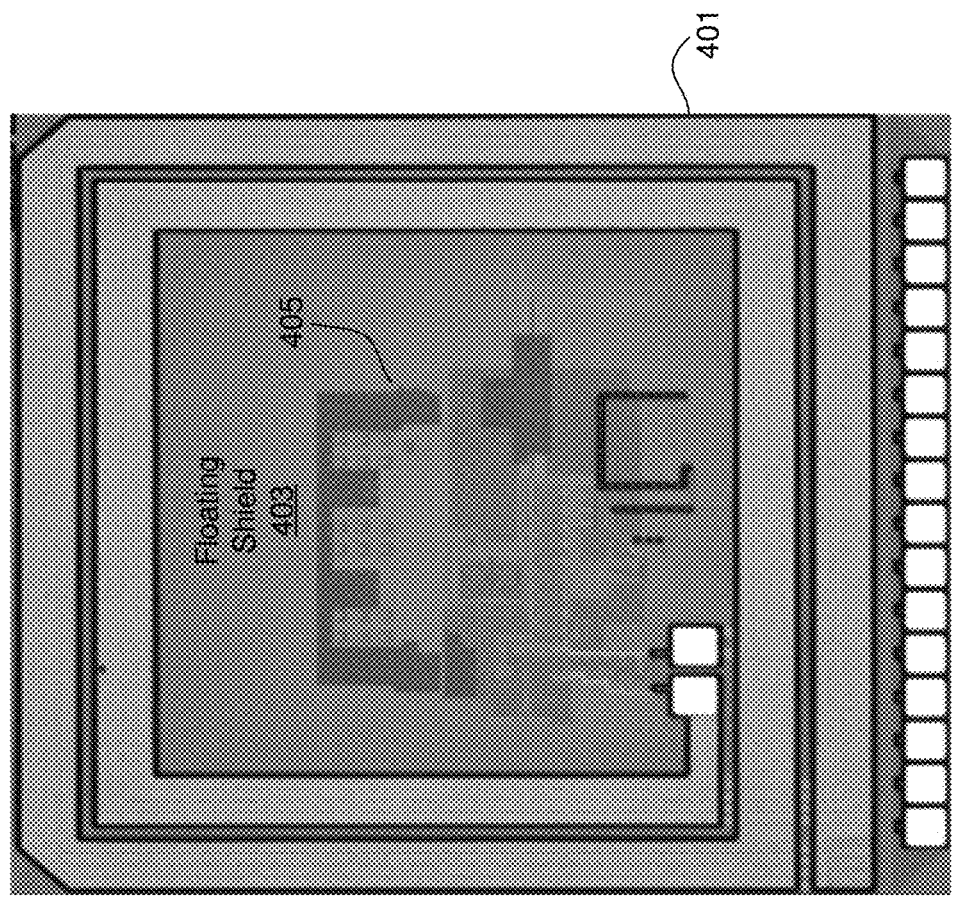
FIG. 4 is a micrograph of a receiver coil die, in accordance with an example embodiment of the disclosure.

FIG. 4 is a micrograph of a receiver coil die, in accordance with an example embodiment of the disclosure. Referring to FIG. 4, there is shown a receiver coil die 400 comprising a coil 401, a floating shield 403, and active circuitry 405. In order to provide shielding from the lossy substrate on which the receiver coil 401 is fabricated and satisfy CMOS metal fill requirements, the floating shield 403 may be used underneath the Rx coil 401 traces and above the active circuits 405. In another example scenario, the receiver coil 400 may be tapered to improve wireless power transfer efficiency.

Figure 5:
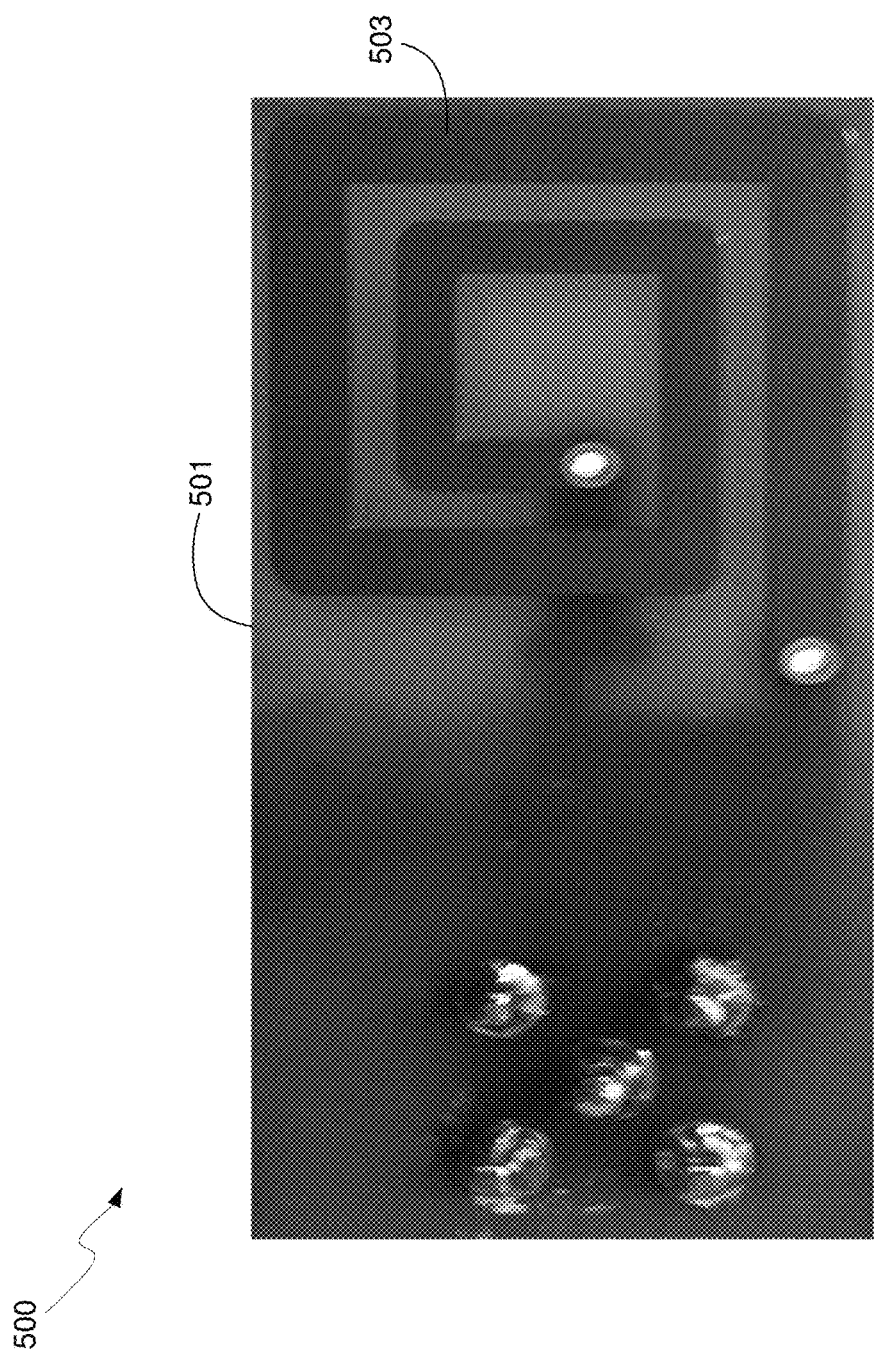
FIG. 5 illustrates a transmitter coil fabricated on a printed cirtcuit board, in accordance with an example embodiment of the disclosure.

FIG. 5 illustrates a transmitter coil fabricated on a printed circuit board, in accordance with an example embodiment of the disclosure. Referring to FIG. 5, there is shown a Tx coil board 500 comprising an FR4, glass reinforced laminate sheets, board 501 and a tapered Tx coil 503. In an example scenario, the tapered transmitter coil 503 may provide optimum loading for the transmitter using an L-match. The matching network can be chosen from a variety of available matching networks or be included as part of the transmitter coil design.

Figure 6:
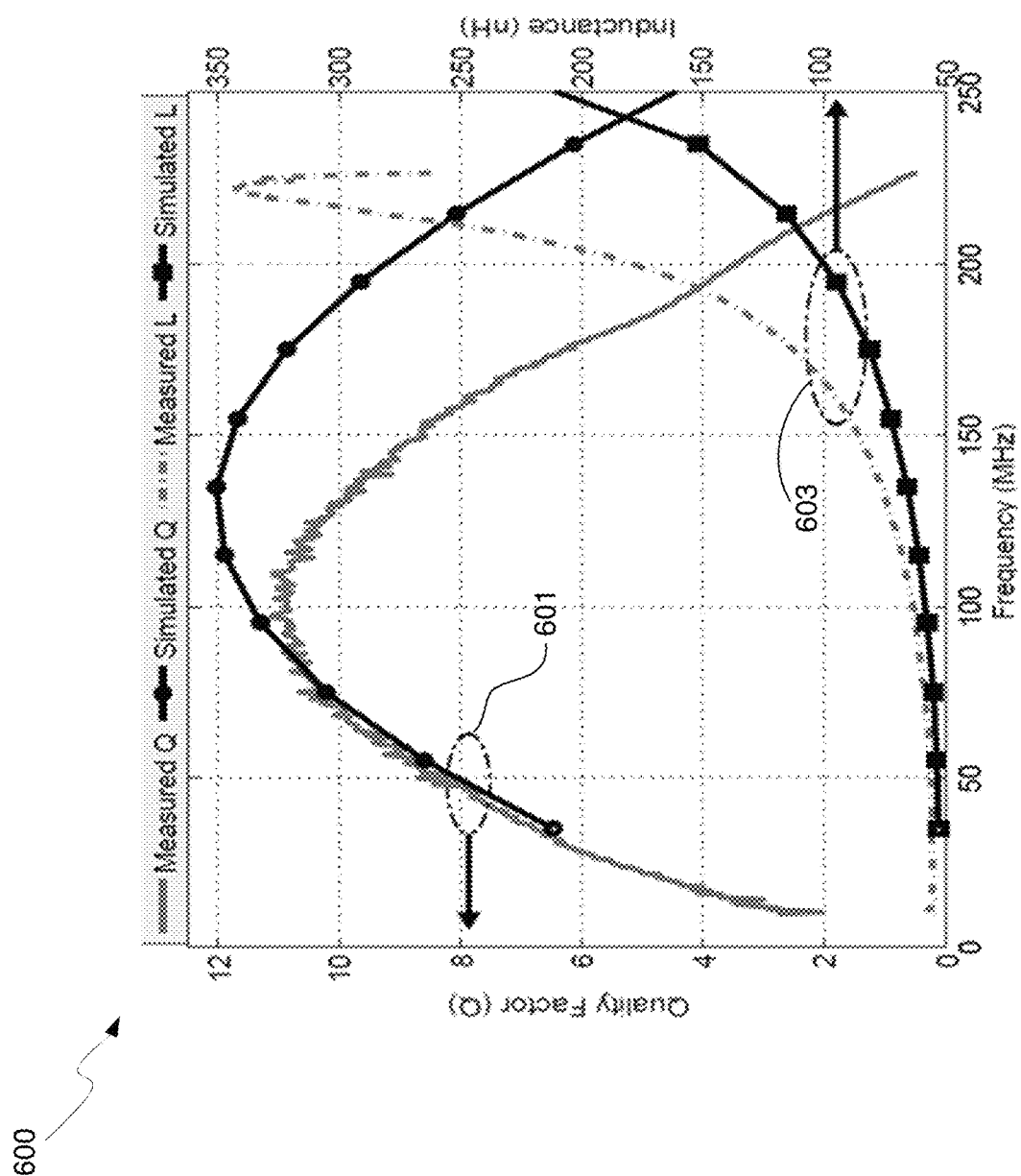
FIG. 6 shows measurement and simulation results for the on-chip receiver coil, in accordance with an example embodiment of the disclosure.

FIG. 6 shows measurement and simulation results for the on-chip receiver coil, in accordance with an example embodiment of the disclosure. Referring to FIG. 6, there is shown a plot 600 of quality factor 601 and inductance 603. It is evident that by properly designing the Rx coil and with an appropriate choice of frequency, coils may be implemented with high quality factor on a standard CMOS process.

Figure 7:
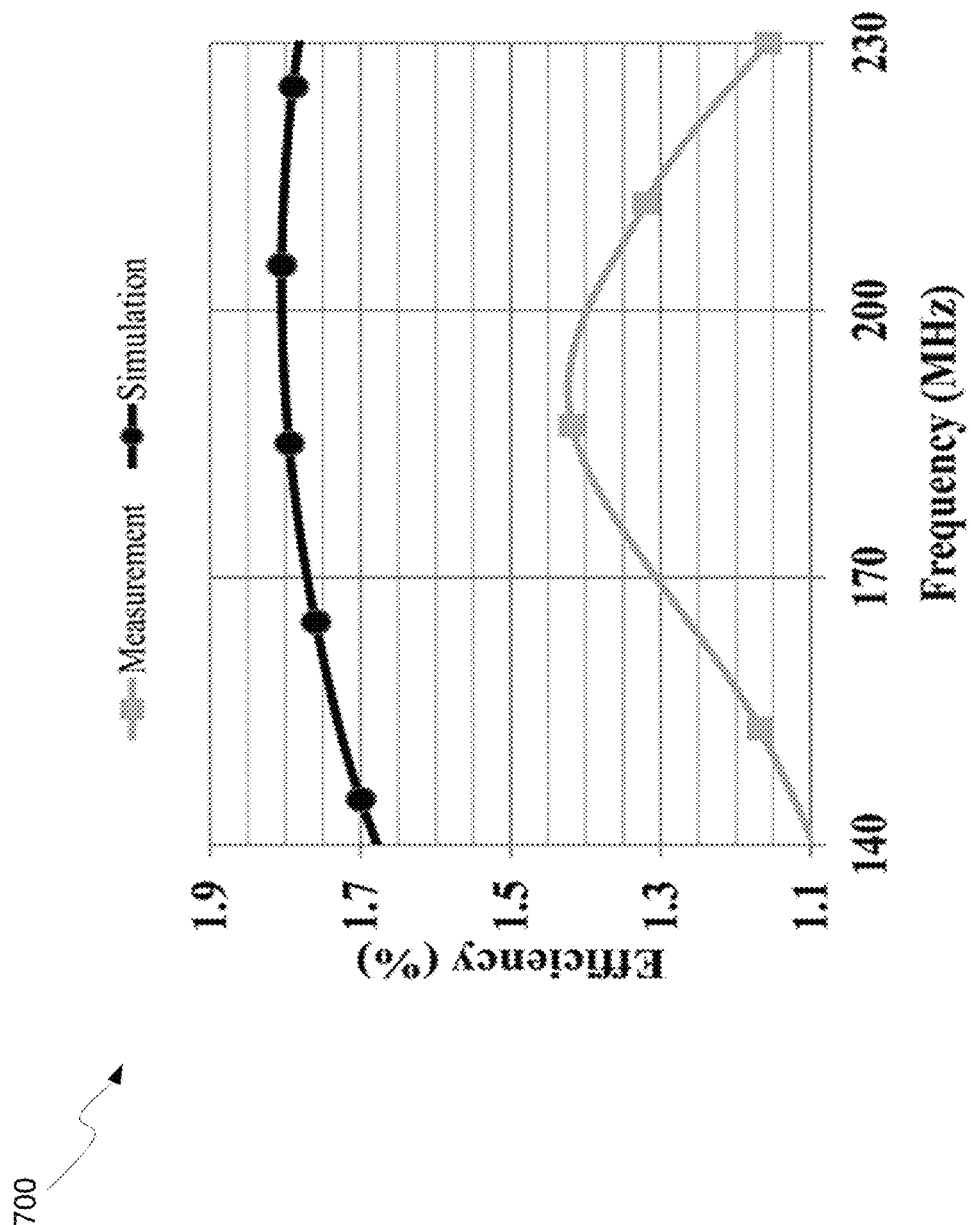
FIG. 7 illustrates measured and simulated power efficiency through 10 mm of air, in accordance with an example embodiment of the disclosure.
Figure 8:
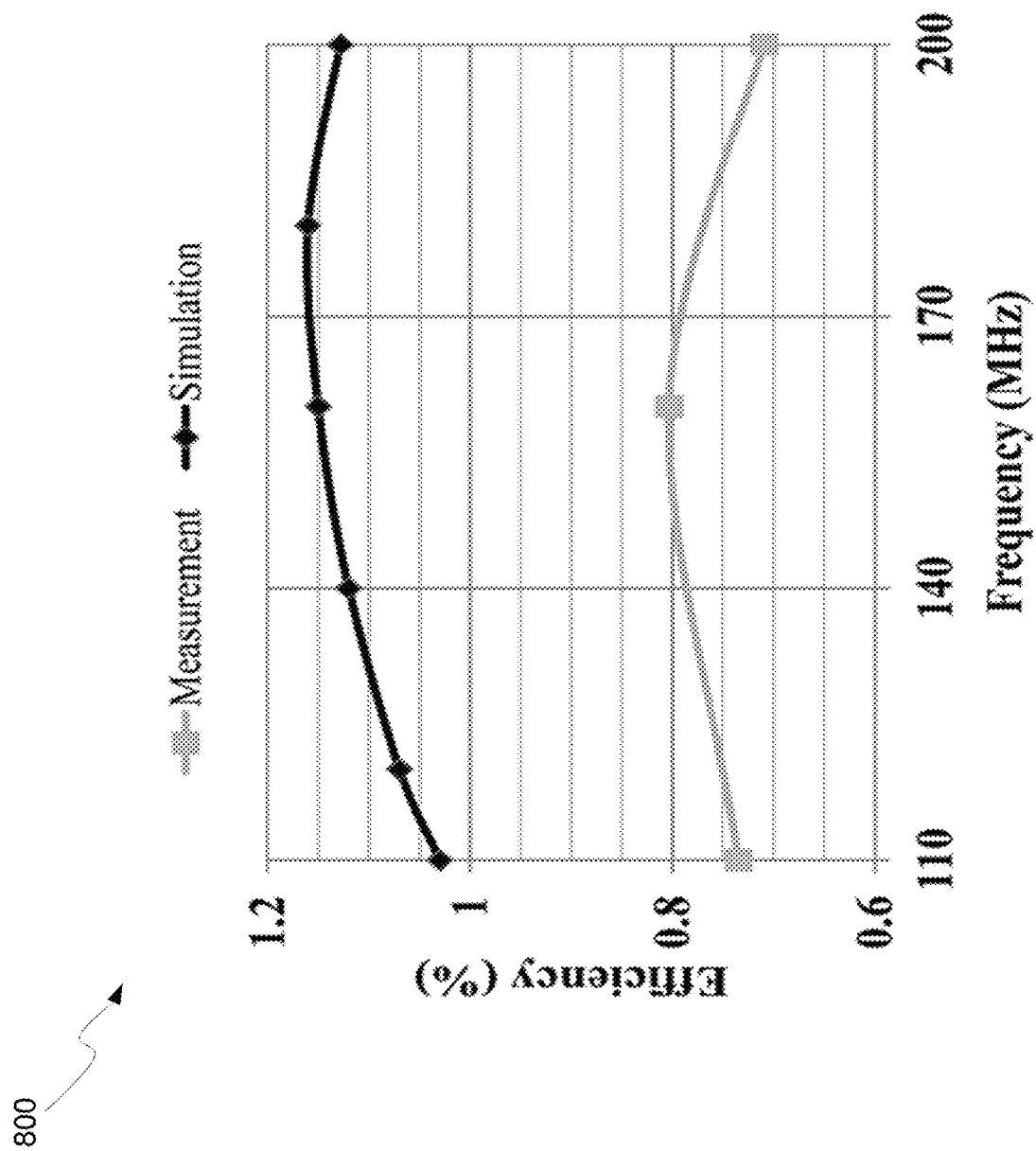
FIG. 8 illustrates measured and simulated power efficiency through 7.5 mm of bovine muscle and 2.5 mm of air, in accordance with an example embodiment of the disclosure.
Figure 9:
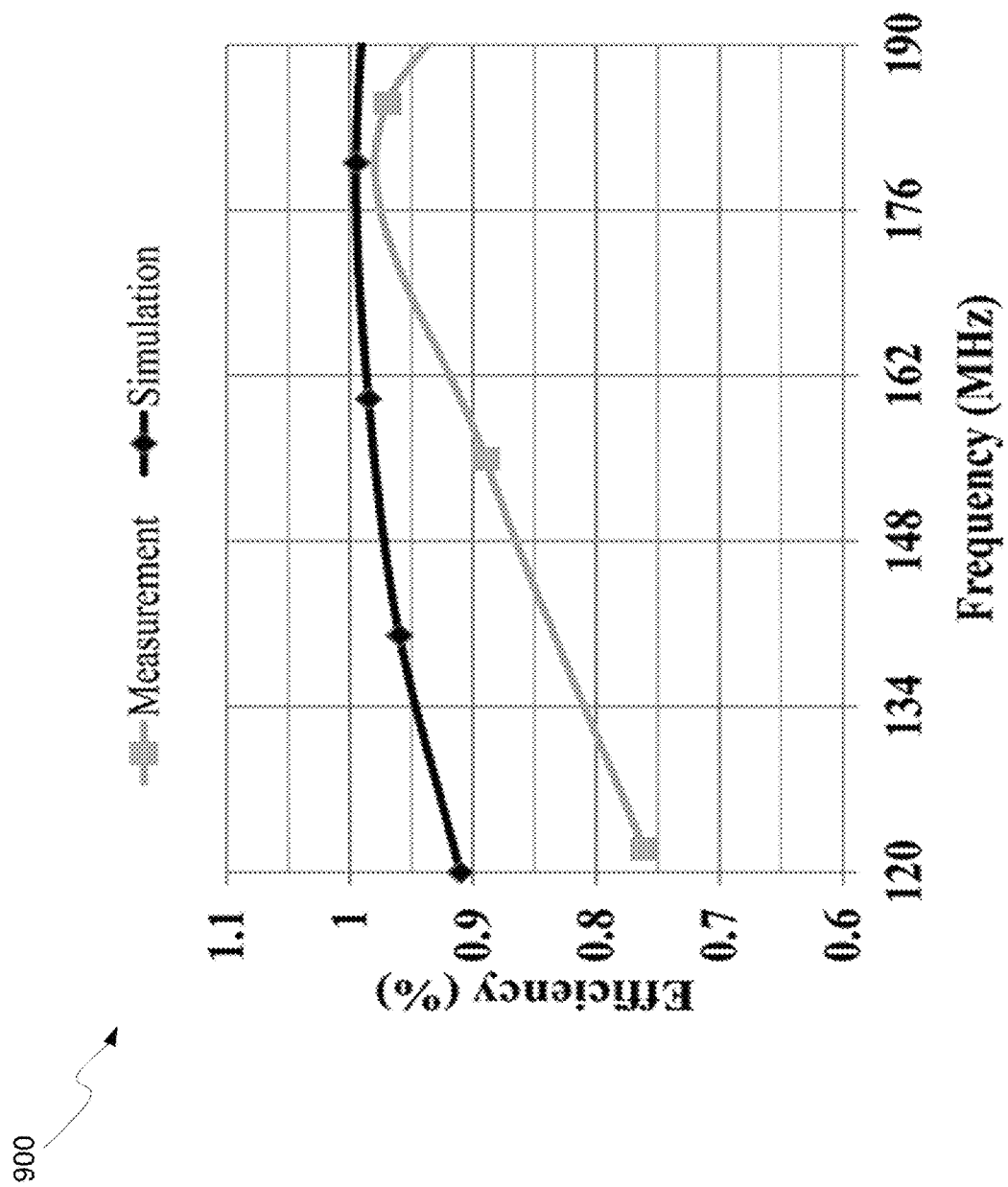
FIG. 9 illustrates measured and simulated power efficiency through 7 mm of 0.2 molar NaCl solution and 3 mm of air, in accordance with an example embodiment of the disclosure.

The power transfer efficiency measurement results of FIG. 7 and the coil characterization shown in FIG. 6 were performed using an Agilent E8361A PNA Microwave Network Analyzer. The measurements were performed at different frequencies through air, liquid (7 mm of 0.2 molar NaCl solution and 3 mm of air) and tissue (7.5 mm of bovine muscle and 2.5 mm of air), for a total of 10 mm separation in each scenario. During these measurements, the receiver and transmitter coils were aligned (i.e., parallel coils with geometric centers aligned). The NaCl solution mimics the electromagnetic properties of blood. The maximum achievable efficiency was then calculated using the measured S-parameters based on the equation for maximum achievable efficiency in passive WPT systems:

$$\eta_{max} = \frac{\chi}{\left(1 + \sqrt{1 + \chi}\right)^2}, \chi = \frac{|Z_{12}|^2}{\text{real}(Z_{11})\text{real}(Z_{22}) - \text{real}(Z_{12}^2)}$$

where $Z_{ij}$ represent the Z parameters for the two port network from the input of Tx coil to the output of the Rx coil. The measured efficiency through (a) air, (b) bovine muscle, and (c) 0.2 molar NaCl solution are shown in FIGS. 7, 8, and 9 respectively.

Table II shows a comparison of this work with the best published results. The last column in the table presents the efficiency versus area (A) tradeoff normalized by separation (S). It is evident that the fully integrated power receiver can out-perform coils designed on PCB or coils designed using custom fabrication techniques.

TABLE II

COMPARISON OF WPT EFFICIENCY.

| | Technology | A (mm²) | S (mm) | η (%) | Media | η×S/A |
|---|---|---|---|---|---|---|
| This Work | CMOS | 4.3 | 10 | 1.5 | Air | 3.38 |
| [1] | Custom | 20.2 | 12 | 4.3 | Air | 2.55 |
| This Work | CMOS | 4.3 | 10 | 0.8 | Muscle | 1.84 |
| [7] | PCB | 1 | 13 | 0.06 | Air | 0.78 |
| [8] | PCB | 4 | 15 | 0.08 | Muscle | 0.30 |

A consideration in designs for in vivo applications is the limit for safe exposure to radio-frequency energy. This limit is specified in terms of a unit referred to as the Specific Absorption Rate (SAR). SAR is a measure of the rate at which radio frequency energy is absorbed by the body. In other words, SAR limits the heating of conductive tissues due to transmitter electromagnetic fields by limiting the maximum allowed transmit power. The combination of SAR limits and the link efficiency determine the maximum deliverable power to the load. In the US, the SAR value is limited to 1.6 W/Kg averaged over 1 gram of tissue by the Federal Communications Commission (FCC). In Europe, the Comit'e Europ'een de Normalisation ´ Electrotechnique (CENELEC) limits the SAR value to 2 W/Kg averaged over 10 grams of tissue. In an example scenario, this disclosure describes the maximum deliverable power to the load for neural implants as the target application. The SAR value was simulated using HFSS based on a 6-layer (skin, fat, skull, dura, cerebrospinal fluid and brain) head model. The maximum allowed transmitter power to stay under the SAR limit was calculated across several frequencies when the transmitter coil was positioned 3 mm away from the head.

FIG. 7 illustrates measured and simulated power efficiency through 10 mm of air, in accordance with an example embodiment of the disclosure. As shown by the power efficiency plot 700, the simulated efficiency through air peaks at 1.8% while the measured efficiency reaches ~1.4%.

FIG. 8 illustrates measured and simulated power efficiency through 7.5 mm of bovine muscle and 2.5 mm of air, in accordance with an example embodiment of the disclosure. As shown by the power efficiency plot 800, the simulated efficiency through bovine muscle and air peaks at ~1.8% while the measured efficiency reaches ~0.8% at a slightly lower frequency, ~160 MHz versus a calculated peak frequency of ~180 MHz.

FIG. 9 illustrates measured and simulated power efficiency through 7 mm of 0.2 molar NaCl solution and 3 mm of air, in accordance with an example embodiment of the disclosure. As shown by the power efficiency plot 900, the simulated efficiency through NaCl solution and air peaks at ~1% while the measured efficiency reaches just below 1%.

Figure 10:
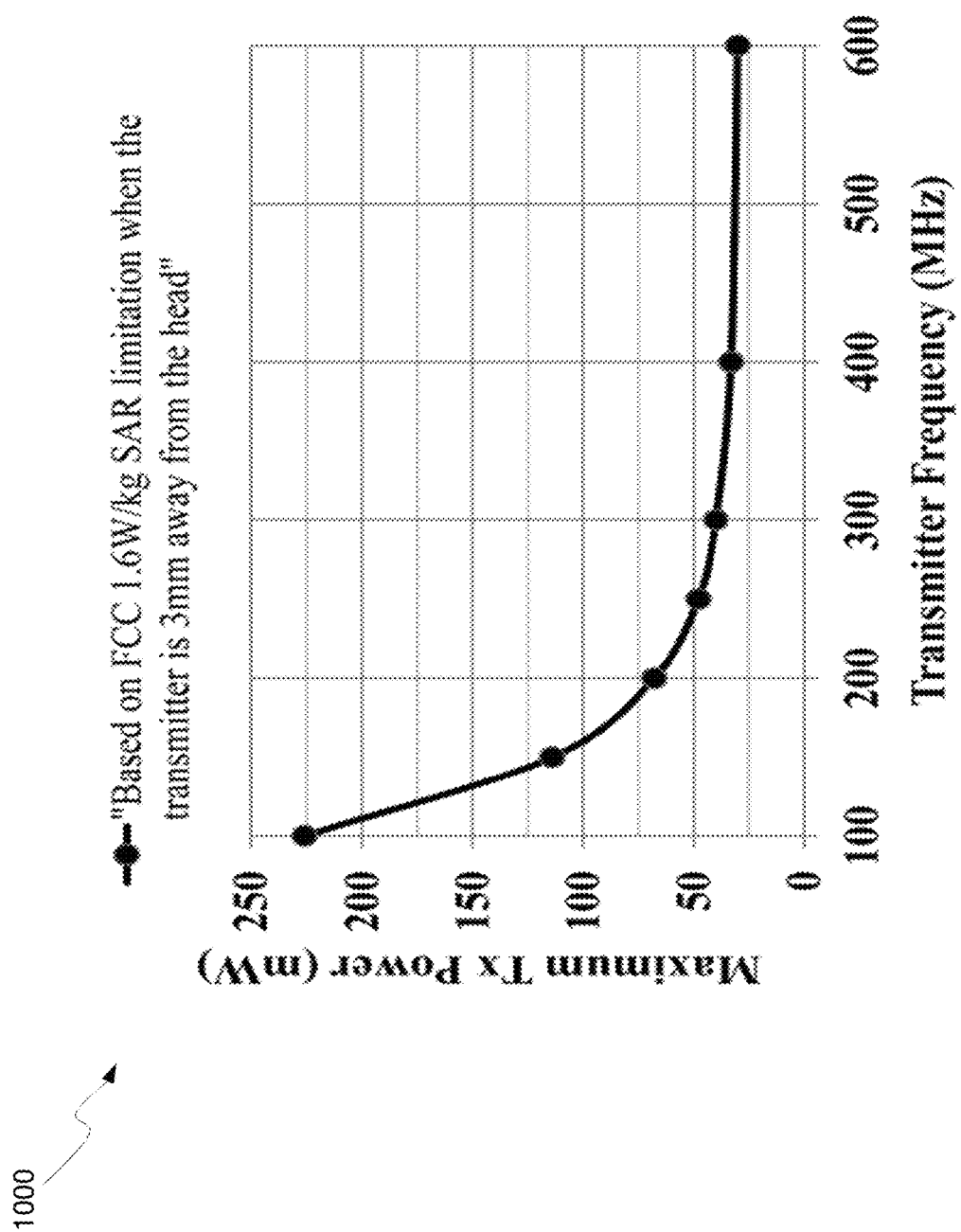
FIG. 10 illustrates maximum allowed transmission power to a brain implant to stay under FCC SAR constraint as a function of the transmitter frequency, in accordance with an example embodiment of the disclosure.

FIG. 10 illustrates maximum allowed transmission power to a brain implant to stay under FCC SAR constraint as a function of the transmitter frequency, in accordance with an example embodiment of the disclosure. Referring to FIG. 10, there is shown a plot 1000 of maximum Tx power in mW versus transmitter frequency. The maximum allowed transmitter power versus transmitter distance to head was calculated for the transmitter operating at 160 MHz.

Maximum achievable efficiency is realized under optimum load conditions. The optimum load admittance to maximize the WPT efficiency of any passive network is characterized by the two-port admittance matrix, $Y_{ij}$, from the input of the Tx coil to the output of the Rx Coil:

$$\text{Optimum load admittance} = \frac{\text{imag}(Y_{12})\text{real}(Y_{12})}{\text{real}(Y_{11})} - \text{imag}(Y_{22})$$

However, the exact value of the optimum load may be unknown during the design phase. As a result, the designed susceptance of the matching network could vary from optimum susceptance. It can be mathematically proven that in any passive network, the optimum load susceptance for a fixed load conductance that is not necessarily equal to the optimal load conductance is the optimal susceptance. Hence we can find the global optimum load susceptance by maximizing the receiver power with respect to the load capacitance under a fixed load resistance. The optimization can be realized using a gradient descent algorithm by varying the capacitance under a fixed resistive load and monitoring the gradient of the power delivered to the load at the output of the rectifier. A good candidate for adjusting the susceptance is a binary-weighted capacitor array.

In theory, it is possible to get as close to the optimum susceptance as desired using a large number of binary-weighted capacitors. However, in practice it may be difficult to guarantee a monotonic behavior. The tunable capacitance may be divided into four binary weighted capacitors and two smaller thermometer coded capacitors to further improve the output voltage. In an example scenario, the smallest binary capacitor size was chosen to ensure a minimum of 50 mV change in the voltage level, thereby relaxing the constraint on the comparator. The sign-based gradient descent algorithm can maximize a function F(x) if the variable x is updated $$x_{i+1} = x_i + \gamma \times \text{sign}(\nabla F(x_i))$$

where $\nabla$ represents the gradient of a function and $\gamma$ is the step size. Therefore, the operation can be performed using a simple comparator.

Figure 11:
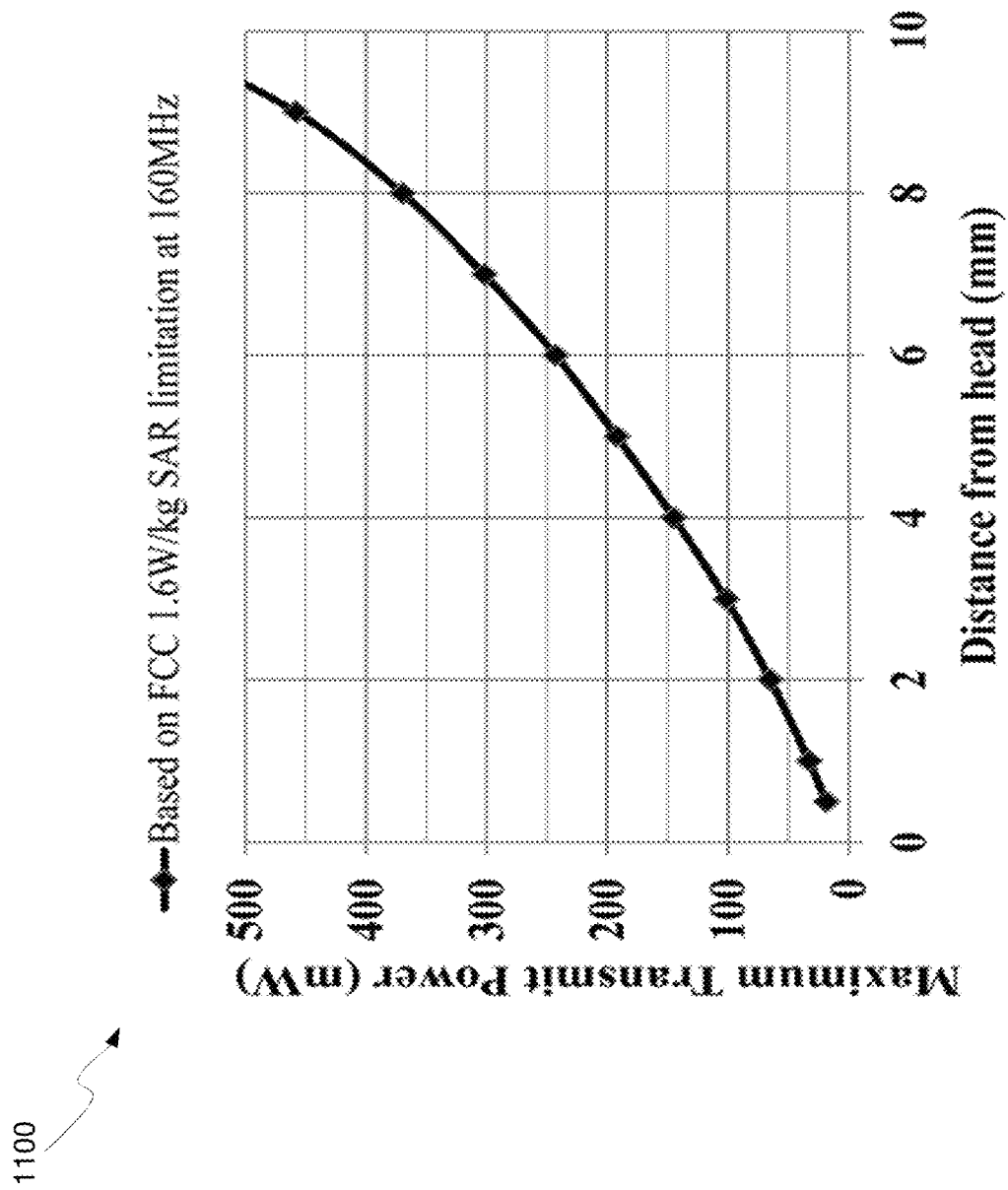
FIG. 11 illustrates maximum allowed transmission power to a brain implant to stay under FCC SAR constraint as a function of the distance between a transmitter and head, in accordance with an example embodiment of the disclosure.

FIG. 11 illustrates maximum allowed transmission power to a brain implant to stay under FCC SAR constraint as a function of the distance between a transmitter and head, in accordance with an example embodiment of the disclosure. Referring to FIG. 11, there is shown a plot 1100 of the maximum Tx power in mW versus distance from a head. In these simulations, the more restrictive FCC limit was utilized. The maximum allowed power for CENELEC is higher than the FCC limit. For example, the maximum allowed power of the example transmitter working at 160 MHz and 4 mm away from the head may be limited to 146 mW under FCC limits, while it can transmit 183 mW under the same conditions using the CENELEC limit. Therefore, the proposed design can deliver milliwatts of power to the load while staying under the SAR constraint. These power transfer limits can be improved by modifying the transmitter design or reducing the frequency of operation.

FIG. 12 is a block diagram of an adaptation circuit, in accordance with an example embodiment of the disclosure. Referring to FIG. 12, there is shown an adaptation circuit 1200 comprising an Rx coil 1101, an array of switched capacitors 1203, rectifier diodes $D_1$-$D_4$, a delay flip flop 1205, an adaptation algorithm block 1207, a frequency divider 1209, a comparator 1211, a ring counter 1213, a comparator input impedance circuit 1215, a non-overlap delay block 1217, and a power on reset 1219. FIG. 12 shows an example implementation of an adaptation algorithm. In this example scenario, the binary-weighted capacitor values for the switched capacitors 1203 were chosen slightly smaller to account for the parasitic capacitances from the switches.

The bridge rectifier comprising the diodes $D_1$-$D_4$ may generate a DC voltage from an RF signal, RF+ and RF−, received by the Rx coil 1201. The DC voltage, labeled $V_{dd1}$, may be coupled to the comparator 1211 via the comparator input impedance circuit 1215, which may apply a configurable DC voltage or ground to either input of the comparator 1211.

The output of the comparator 1211 may be coupled to the adaptation circuit 1207, which may be operable to configure the desired capacitance of the switched capacitors 1203. The capacitors sample the output of the rectifier ($V_{dd1}$) which may be the same as the comparator supply voltage, i.e. using the same signal. The 2C, C, ground combination configures the sampled voltage ($V_{dd1}$) is multiplied by ⅔, which is merely an example voltage. Any voltage fraction may be utilized, as long as it is less than one, because a comparator with a supply of $V_{dd1}$ cannot compare inputs close to $V_{dd1}$, and in this example scenario, the choice of ⅔ relates to the input transistor range.

The node labeled RF—may also be coupled to the clock input of the delay flip flop 1205, with the Q output coupled to the frequency divider 1209, which in an example scenario may comprise a divide-by-32 divider. The reduced frequency signal may be coupled to the ring counter 1213, which may be coupled to the non-overlap/delay circuit 1217. The timing signal extracted by the delay flip flop 1205, the frequency divider 1209, the ring counter, and the non-overlap/delay circuit 1217 may be to control the timing of the sampling switch so sampling $V_{dd1}$ is accurate with no charge sharing.

The adaptation algorithm block 1207 may be operable to configure the switched capacitors 1203. In operation, there may be an optimum capacitor value and resistor (load) value that correspond to maximum efficiency. In this example scenario, the algorithm in the adaptation algorithm block 1207 may determine the optimum capacitor.

The load resistor, as illustrated by load resistor 1221, may be determined by the circuit power consumption, but may be determined independently of this algorithm. Therefore, the goal may be to find the optimum capacitor for whatever the load happens to be when the chip is working. We have mathematically shown that under a fixed conductance, such as a load resistor 1221 at the output of the rectifier, labeled $V_{dd1}$, the desired capacitance is determined the algorithm when the highest voltage at $V_{dd1}$ node, with the input voltage on the coil being constant, is reached.

In this example embodiment, due to the small coupling, changing the capacitors has a very minor effect on the input coil voltage and therefore this capacitance based on peak $V_{dd1}$ voltage still holds. In systems with strong coupling, after any change in the capacitance, the transmitter may need to adjust its matching network to provide constant voltage on the coil, which would cause the need for enough delay between the steps or some sort of communication between the transmitter and the receiver.

In an example scenario, in order to find this optimum capacitor, all the non-critical circuits on the chip may be disabled and a large resistor, such as load resistor 1221, may be coupled to the output of the rectifier ($V_{dd1}$) as the load. Then the voltage at $V_{dd1}$ may be sampled by comparator 1211 utilizing control signals $\phi_{1D}$, $\phi_6$, and $\phi_4$. The capacitance may then be changed, via $b_0$-$b_3$, $c_0$ and/or $c_1$, and the voltage $V_{dd1}$ may again be sampled. If the voltage increases, this indicates that the capacitance is in the correct direction and the capacitance change continues, and if not, the capacitance may be changed in the other direction. In an example implementation, the capacitance may start from a minimum and increase until $V_{dd1}$ starts to decrease. However, any other optimization algorithm may be implemented.

Figure 13:
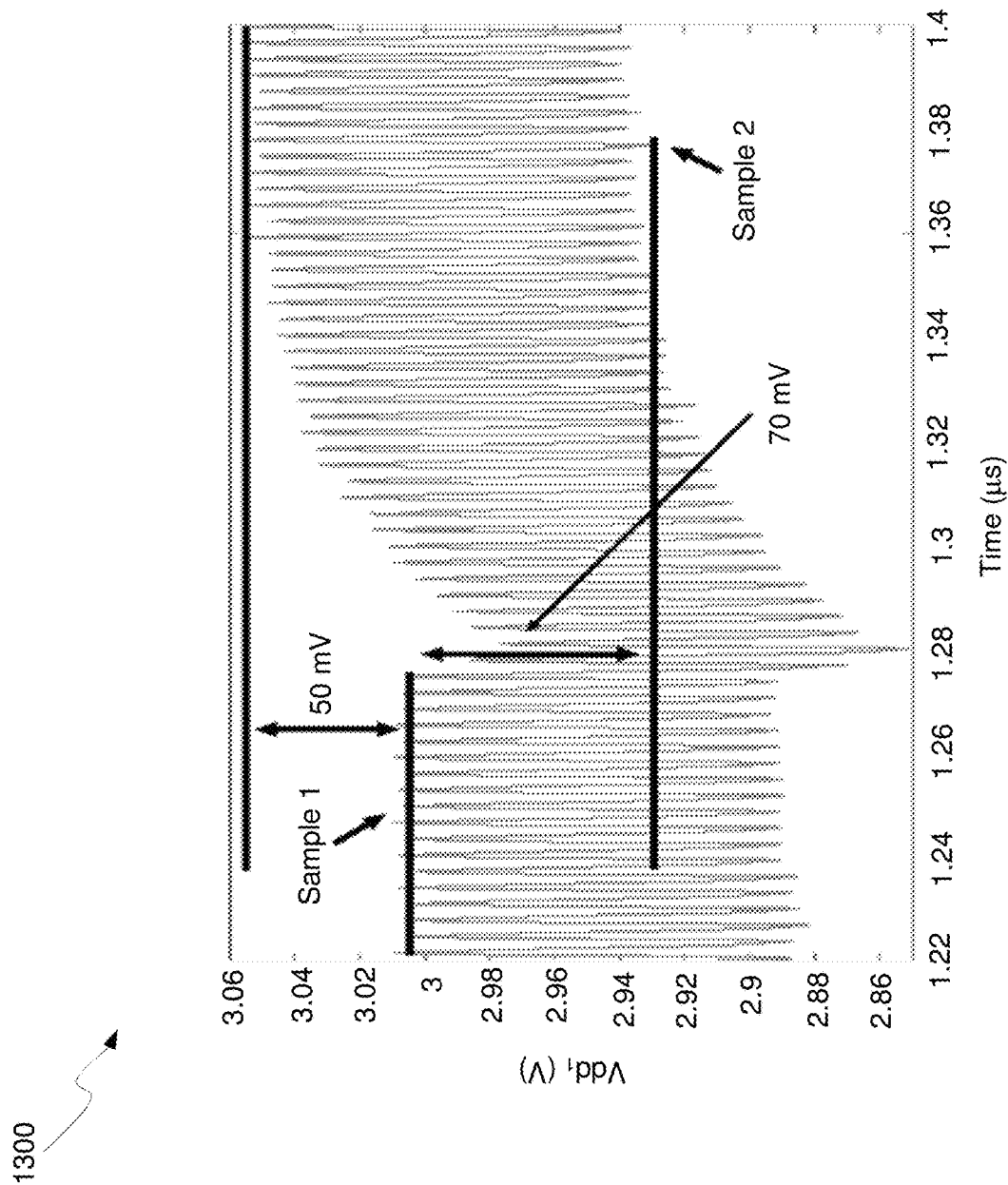
FIG. 13 illustrates a sampling phase sensitivity issue with voltage rectifiers.

FIG. 13 illustrates a sampling phase sensitivity issue with voltage rectifiers. In practice, a rectifier output may have a large ripple, as illustrated by the ripple in the voltage plot 1400. Thus, the sampling time may become an important factor to functionality of the adaptation block. As illustrated by the $V_{dd1}$ plot 1300 in FIG. 13, even though the average voltage of the rectifier output ($V_{dd1}$) has increased by 50 mV, depending on the sampling time, the comparator might experience up to a 70 mV drop in the rectifier voltage and hence make a wrong decision. In this design, the clock may be directly extracted from the incoming RF signal. As a result, the rectifier ripple may be sampled at the same phase by the circuit shown in FIG. 12, thereby eliminating the uncertainty in output voltage.

Figure 14:
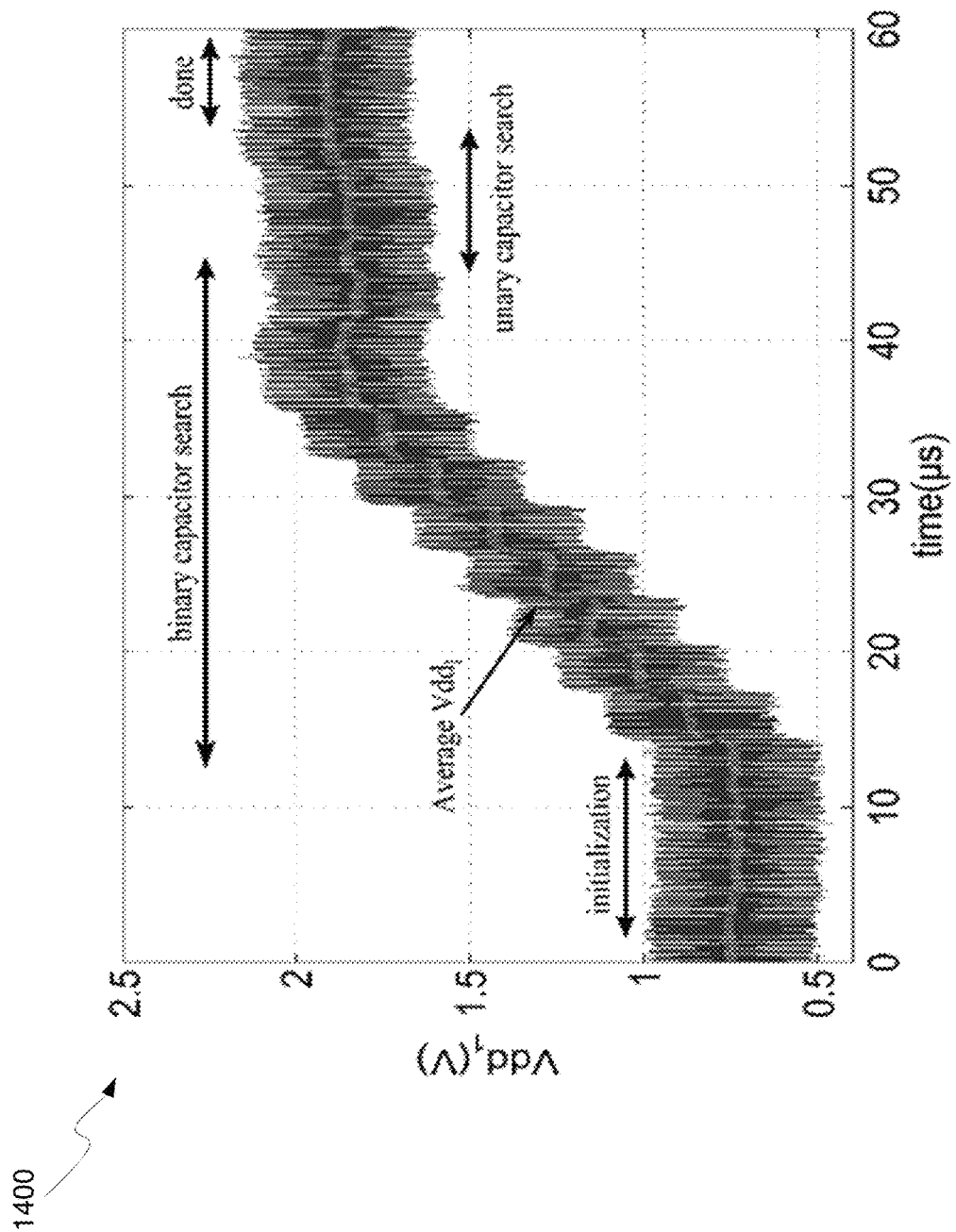
FIG. 14 illustrates measured rectifier output during an adaptation process, in accordance with an example embodiment of the disclosure.

FIG. 14 illustrates measured rectifier output during an adaptation process, in accordance with an example embodiment of the disclosure. Referring to FIG. 14, there is shown a plot of measured rectifier output voltage $V_{dd1}$ as it goes through an adaptation process. Despite the large ripple on the output voltage, the adaptation algorithm converges to the voltage guaranteeing maximum efficiency.

Figure 15:
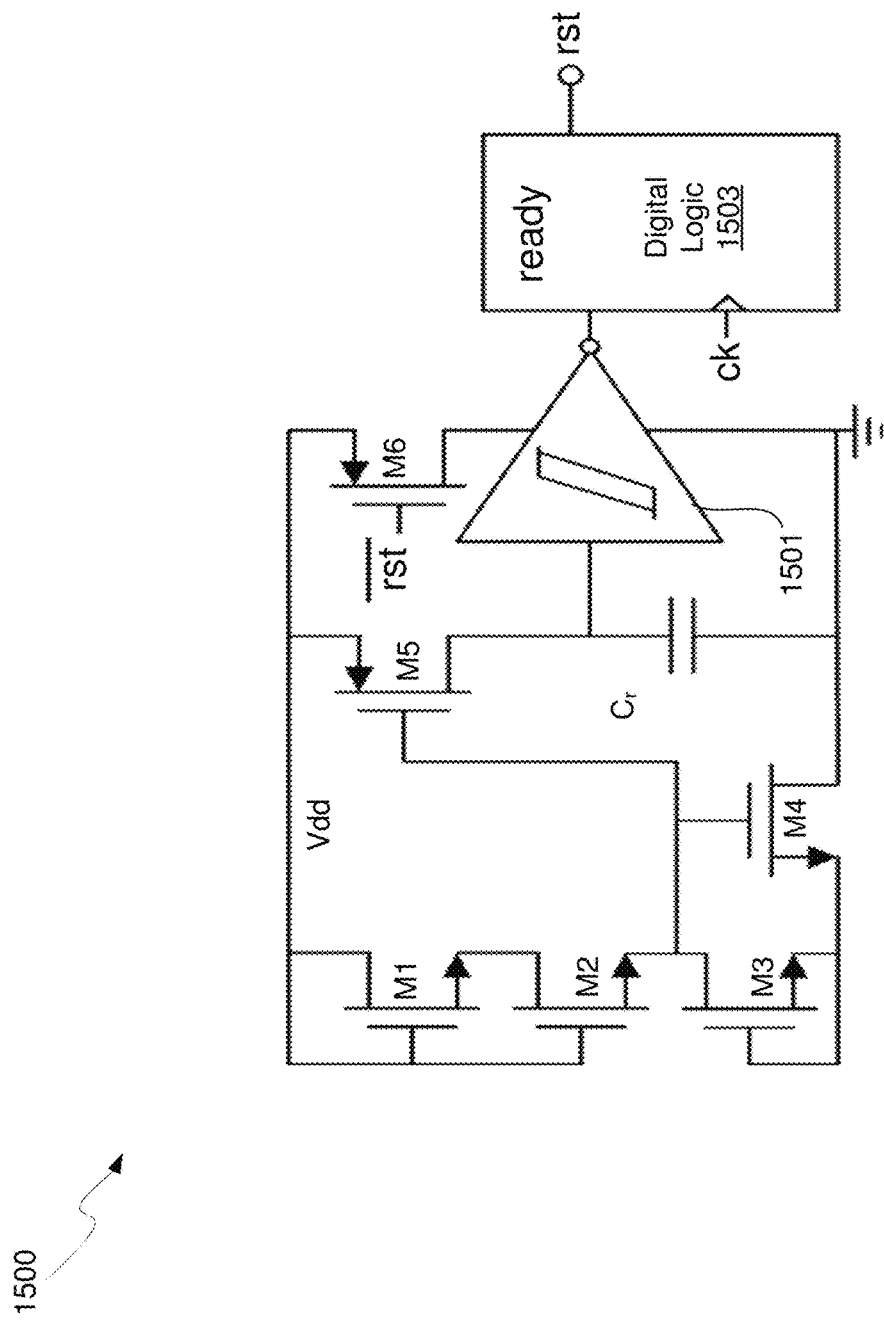
FIG. 15 illustrates a two-stage power-on-reset circuit, in accordance with an example embodiment of the disclosure.

FIG. 15 illustrates a two-stage power-on-reset circuit, in accordance with an example embodiment of the disclosure. The algorithm may be initialized during the reset state using the power-on-reset (POR) circuit 1500 shown in FIG. 15. The POR circuit 1500 may comprise two stages, where the first stage resets the digital logic 1503. The first stage may comprise NMOS transistors M1-M4, PMOS transistors M5 and M6, a capacitor Cr, and an inverter 1501. The digital logic then provides sufficient delay for the rectifier T-gates to turn on and the voltage to become stable.

A high efficiency rectifier takes energy from the Rx coil producing an output with minimum loss. However, directly connecting the rectifier to the large on-chip-coil would result in plasma-induced gate-oxide damage commonly referred to as the antenna effect. One proposed solution is to connect the Rx coil to ground for fabrication and cut the desired connection after fabrication using FIB (Focused Ion Beam). This method however introduces extra cost due to post-processing steps and reduces the reliability. In the rectifier disclosed here, the gates of the NMOS transistors may be connected to the Rx coil using a T-gate switch, as shown in FIG. 16.

Figure 16:
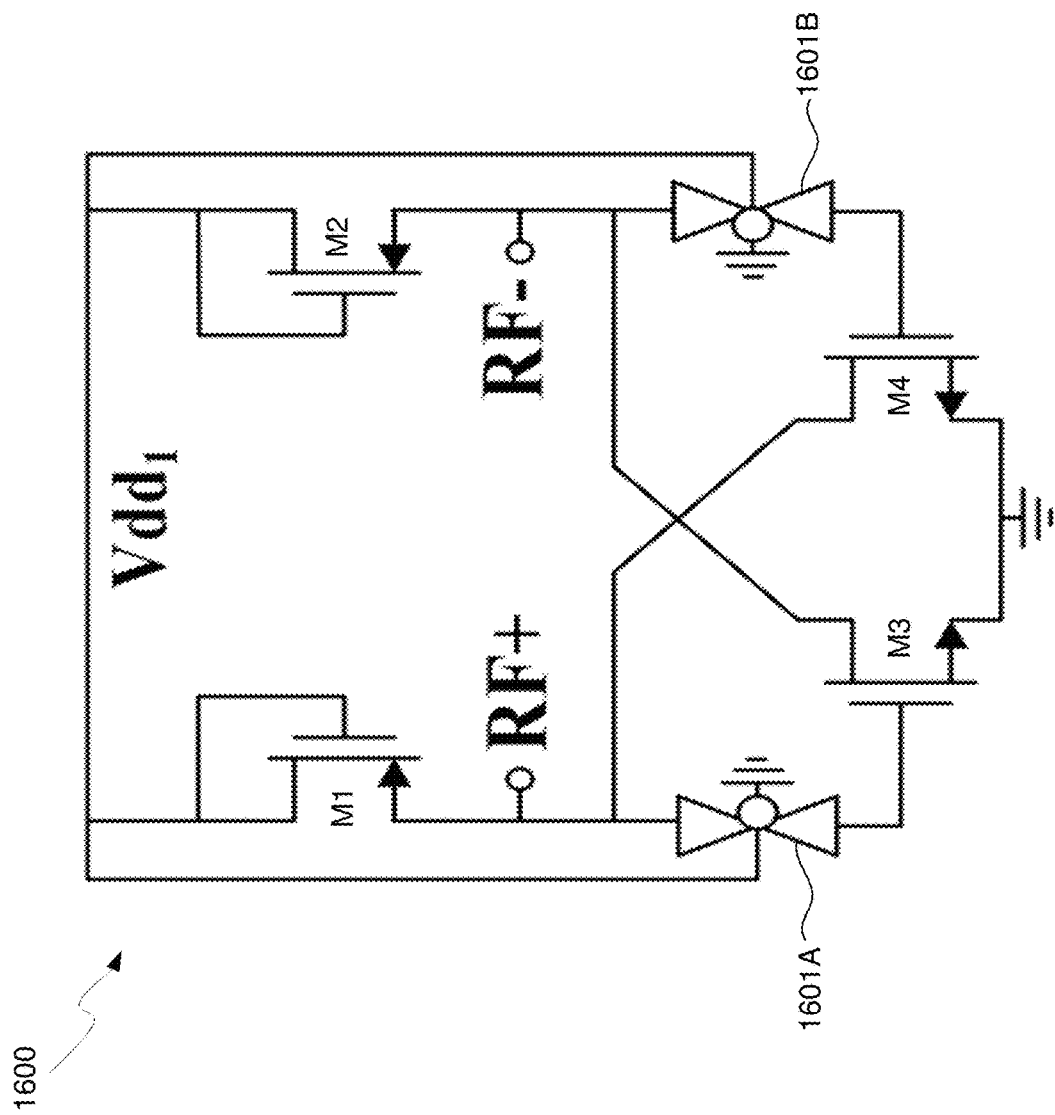
FIG. 16 illustrates a rectifier circuit configuration, in accordance with an example embodiment of the disclosure.

FIG. 16 illustrates a rectifier circuit configuration, in accordance with an example embodiment of the disclosure. FIG. 16 shows a schematic for the full-wave rectifier 1600 comprising PMOS transistors M1 and M2, NMOS transistors M3 and M4, and T-gate switches 1601A and 1601B. The T-gate switches 1601A and 1601B may be controlled by a positive feedback signal from the rectifier output.

In general, problems may occur in directly connecting a coil to the gate of the rectifier transistors. This may be safely done using an active switch, or a large resistor, or a combination (e.g. a switch in parallel with a resistor). A switch may have a control signal which in an example scenario may be controlled by the output of the rectifier. As the rectifier accumulates more voltage at the output, the switch is better turned on, the rectifier operates more effectively (higher conversion efficiency) and therefore more voltage may be available at the output. This forms a positive feedback and guarantees the switch to turn on.

Other options for coupling the coil to the rectifier may comprise utilizing an auxiliary voltage source or rectifier. Alternatively, a more complicated circuit may be utilized, such as a comparator, which may use the rectifier output voltage as the supply, to control the gate.

Initially, the T-gate switches 1601A and 1601B may be off and the rectifier behaves similar to a two-diode rectifier. However, as the output voltage increases, the T-gates 1601A and 1601B become more effective in passing the charge, further improving the output voltage through the positive feedback. Once the output surpasses the threshold voltage of the T-gate transistors, the rectifier 1600 transforms into a full-wave bridge rectifier and effectively rectifies the harvested voltage.

The total efficiency from the transmitter to the rectified DC voltage is given by:

$$\eta_{total} = \eta_{link} \times \eta_{matching} \times \eta_{rectifier}$$

Figure 17:
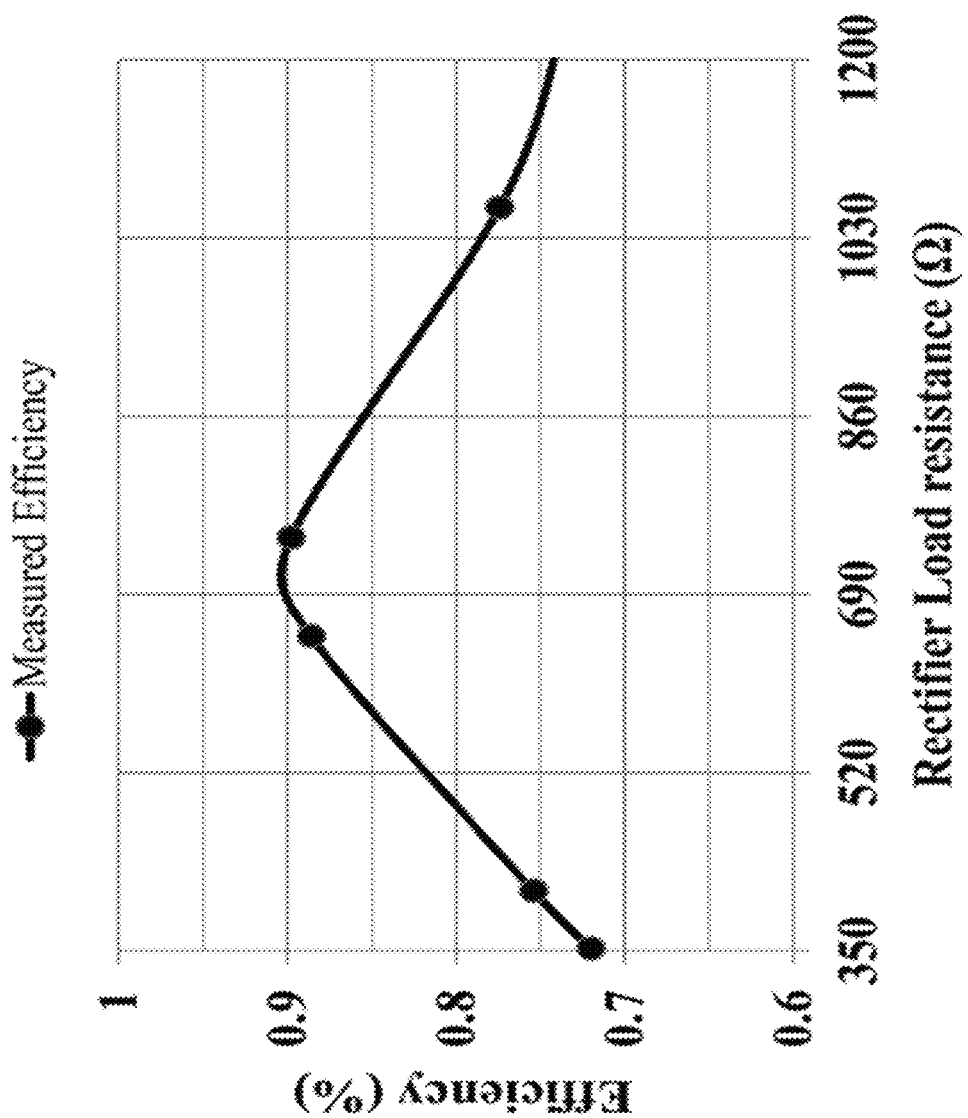
FIG. 17 illustrates a measured efficiency from the transmitter to the output of the rectifier at 160 MHz and 10 mm of air separation, in accordance with an example embodiment of the disclosure.

FIG. 17 illustrates a measured efficiency from the transmitter to the output of the rectifier at 160 MHz and 10 mm of air separation, in accordance with an example embodiment of the disclosure. In an example scenario, the total link efficiency was calculated by recording the total power delivered to the transmitter board using a directional coupler and a power meter while measuring the output DC voltage of the rectifier. The measurement results are shown in FIG. 17, where the change in efficiency with respect to the load resistance may be mainly due to the load dependency of the link efficiency.

Figure 18:
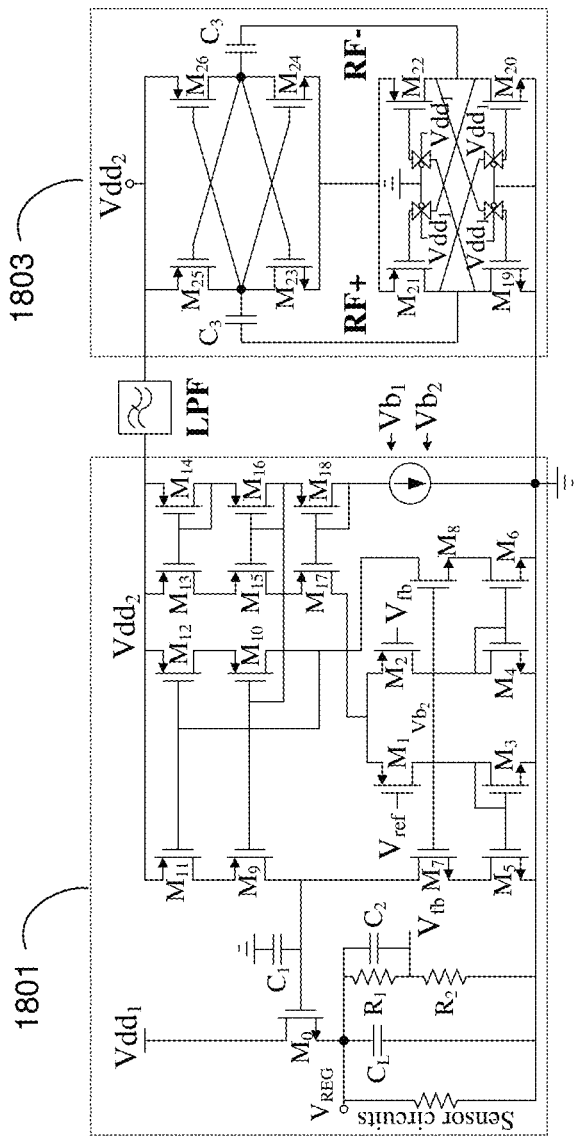
FIG. 18 illustrates a regulator circuit configuration, in accordance with an example embodiment of the disclosure.

FIG. 18 illustrates a regulator circuit configuration, in accordance with an example embodiment of the disclosure. Supply noise may be important to performance of the application circuits such as the sensors, analog-to-digital converters (ADCs), and amplifiers. However, the DC output of the rectifier may have a large voltage ripple at the carrier frequency in the 100 MHz range. Therefore, a regulator with large PSRR may be important to the performance of the system.

A linear series regulator may achieve a high PSRR by effectively lowering the impedance at the output of the regulator. This task demands increasing power as it operates at higher frequencies. Therefore, at high frequencies, the circuits may rely on decoupling capacitors to undertake this task. However, large on-chip capacitors consume a large area of the chip. A regulator with NMOS pass transistors can alleviate the problem at the expense of requiring a voltage higher than the supply voltage. Previous designs used charge-pump circuits. However, the extra circuitry and clocks increase the complexity and power consumption, especially at higher voltages.

In an example scenario, a voltage-boosting rectifier 1803 may be utilized as part of the regulator. The input capacitance of this second rectifier may be absorbed by the coil inductance and therefore does not add any extra dynamic power consumption. In addition, it may only provide power to the regulator amplifier and the bandgap circuit, which are shown in FIG. 19.

Therefore, the efficiency of this rectifier may have negligible effect on the overall power consumption. Furthermore, because of this low current consumption, the second rectifier may generate a smaller ripple compared to the main rectifier and may be isolated from the distortions induced on the main supply by the application circuits. This rectifier may use small transistors (large on-resistance) and a second-order filter at the output to further reduce the supply ripple. Therefore, a higher, cleaner voltage (Vdd2) may be achieved with negligible power penalty.

Figure 19:
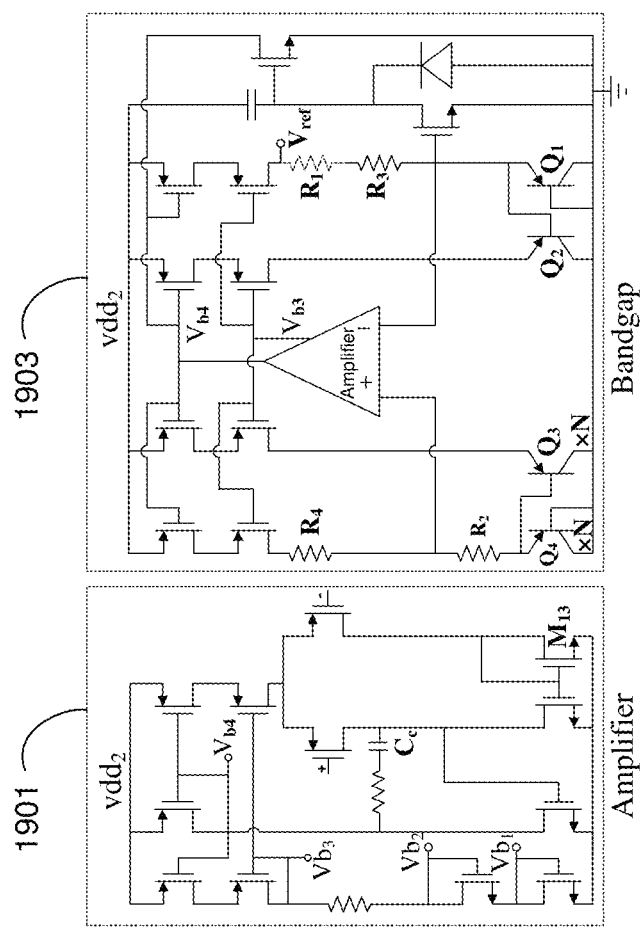
FIG. 19 illustrates a bandgap circuit configuration, in accordance with an example embodiment of the disclosure.

FIG. 19 illustrates a bandgap circuit configuration, in accordance with an example embodiment of the disclosure. The Vdd2 voltage supports the core of the regulator as well as the bandgap circuit shown in FIG. 19. The curvature compensated bandgap achieves a low temperature coefficient by employing different temperature dependent types of resistors.

Figure 20:
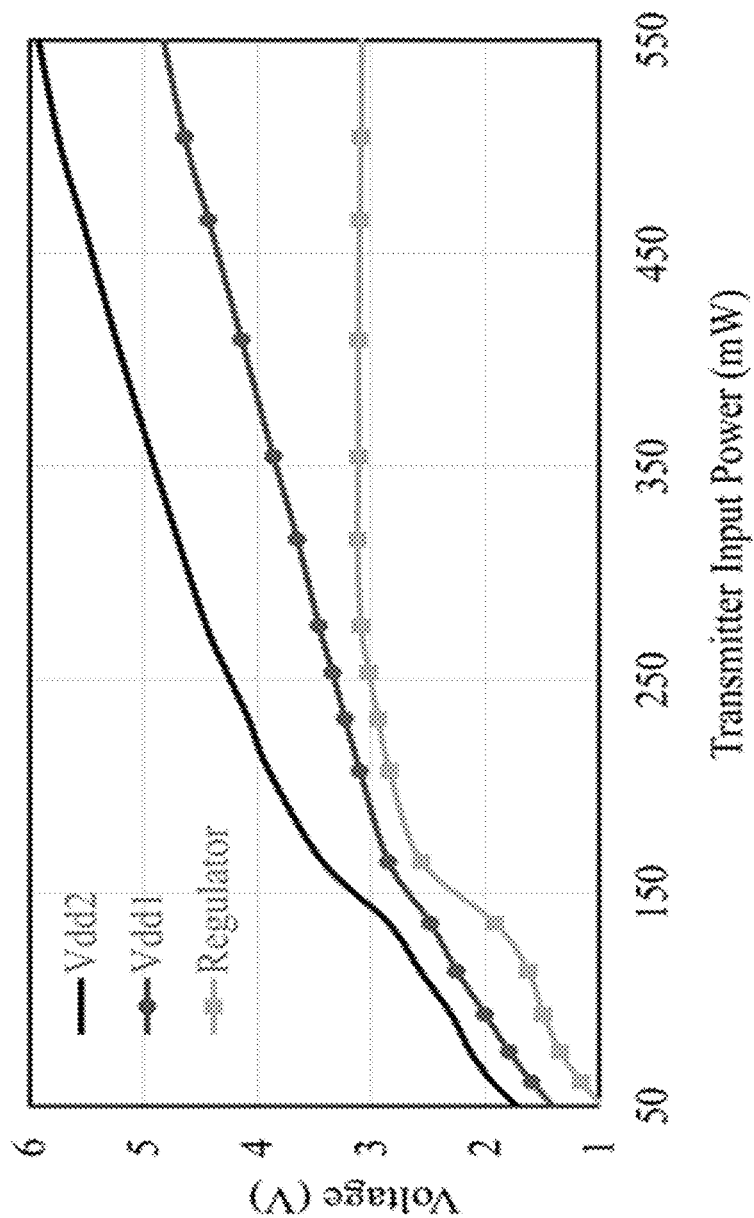
FIG. 20 illustrates a measured regulator output voltage, in accordance with an example embodiment of the disclosure.

FIG. 20 illustrates a measured regulator output voltage, in accordance with an example embodiment of the disclosure. FIG. 20 shows the regulator and the rectifier outputs as the input power to the transmitter is swept. The total capacitance in the example design is 20 pF and achieves a measured 26 dB of ripple rejection. This value was calculated by measuring the ratio of the peak-to-peak ripple at the output of the rectifier and the regulator while the system was powered wirelessly. This number can be further improved by increasing the capacitance or the power consumption.

In an example embodiment, a method and system are disclosed for maximum efficiency achievable in near-field coupled wireless power transfer systems. In this regard, aspects of the disclosure may comprise in a receiver chip with an inductor, a configurable capacitance, and a rectifier: receiving an RF signal utilizing the inductor, extracting a clock signal from the received RF signal, generating a DC voltage utilizing a rectifier circuit, sampling the DC voltage; and adjusting the configurable capacitance based on the sampled DC voltage.

The rectifier circuit may comprise complementary metal oxide semiconductor transistors and T-gate switches for coupling to the inductor. The T-gate switches may be controlled by the generated DC voltage. A signed based gradient-descent algorithm may be utilized to maximize the generated DC voltage. The DC voltage may be sampled utilizing a comparator powered by the generated DC voltage. The configurable capacitance may be adaptively configured based on the sampled DC voltage. The inductor may be shielded utilizing a floating shield and/or tapering. The generated DC voltage may be increased utilizing a voltage-boosting rectifier. The receiver chip may comprise a CMOS chip. The inductor may comprise a plurality of parallel conductive metal strips to meet density rules and reduce high-frequency eddy losses.

As utilized herein, "and/or" means any one or more of the items in the list joined by "and/or". As an example, "x and/or y" means any element of the three-element set {(x), (y), (x, y)}. For example, "x and/or y" means "one or both of x and y". As another example, "x, y, and/or z" means any element of the seven-element set {(x), (y), (z), (x, y), (x, z), (y, z), (x, y, z)}. For example, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/ etc. is "operable" to perform a function whenever the device/module/circuitry/etc. comprises the necessary hardware and code (if any is necessary) to perform the function, regardless of whether performance of the function is disabled, or not enabled, by some user-configurable setting.

While the invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for wireless power transfer, the method comprising:
   in a receiver chip with an inductor, a configurable capacitance, and a rectifier:
   receiving a wireless signal utilizing the inductor;
   generating, utilizing said rectifier, a DC voltage based on the received wireless signal;
   sampling the DC voltage; and
   adjusting the configurable capacitance based on the sampled DC voltage.

2. The method according to claim 1, wherein the rectifier comprises complementary metal oxide semiconductor transistors and T-gate switches for coupling to the inductor.

3. The method according to claim 2, wherein the T-gate switches are controlled by the generated DC voltage.

4. The method according to claim 1, comprising utilizing a signed based gradient descent algorithm to maximize the generated DC voltage.

5. The method according to claim 1, comprising sampling the DC voltage utilizing a comparator powered by the generated DC voltage.

6. The method according to claim 1, comprising adaptively configuring the configurable capacitance based on the sampled DC voltage.

7. The method according to claim 1, wherein the inductor is shielded utilizing a floating shield and/or tapering.

8. The method according to claim 1, comprising increasing the generated DC voltage utilizing a voltage-boosting rectifier.

9. The method according to claim 1, wherein the receiver chip is a CMOS chip.

10. The method according to claim 1, wherein the inductor comprises a plurality of parallel conductive metal strips.

11. A system for wireless power transfer, the system comprising:
   a receiver chip with an inductor, a configurable capacitance, and a rectifier, said receiver chip being operable to:
      receive a wireless signal utilizing the inductor;
      generate, utilizing said rectifier, a DC voltage based on the received wireless signal;
      sample the DC voltage; and
      adjust the configurable capacitance based on the sampled DC voltage.

12. The system according to claim 11, wherein the rectifier comprises complementary metal oxide semiconductor transistors and T-gate switches for coupling to the inductor.

13. The system according to claim 12, wherein the T-gate switches are controlled by the generated DC voltage.

14. The system according to claim 11, wherein the receiver chip is operable to utilize a signed based gradient-descent algorithm to maximize the generated DC voltage.

15. The system according to claim 11, wherein the receiver chip is operable to sample the DC voltage utilizing a comparator powered by the generated DC voltage.

16. The system according to claim 11, wherein the receiver chip is operable to adaptively configure the configurable capacitance based on the sampled DC voltage.

17. The system according to claim 11, wherein the inductor is shielded utilizing a floating shield and/or tapering.

18. The system according to claim 11, wherein the receiver chip is operable to increase the generated DC voltage utilizing a voltage-boosting rectifier.

19. The system according to claim 11, wherein the inductor comprises a plurality of parallel conductive metal strips.

20. A system for wireless power transfer, the system comprising:
   a receiver chip with an inductor, a configurable capacitance, and a rectifier, said receiver chip being operable to:
      receive a wireless signal through a biological media utilizing the inductor;
      generate, utilizing said rectifier, a DC voltage based on the received wireless signal;
      sample the DC voltage utilizing a comparator with an output coupled to an adaptation circuit; and
      adjust the configurable capacitance utilizing the adaptation circuit.

* * * * *